(12) United States Patent  (10) Patent No.: US 8,261,063 B2
Proudler  (45) Date of Patent: Sep. 4, 2012

(54) METHOD AND APPARATUS FOR MANAGING A HIERARCHY OF NODES

(75) Inventor: Graeme John Proudler, Gifford Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2150 days.

(21) Appl. No.: 10/688,397

(22) Filed: Oct. 16, 2003

(65) Prior Publication Data

US 2004/0151319 A1   Aug. 5, 2004

(30) Foreign Application Priority Data

Feb. 3, 2003  (GB) .................................... 0302410.6
Mar. 7, 2003  (GB) .................................... 0305225.5

(51) Int. Cl.
*G06F 21/00* (2006.01)
(52) U.S. Cl. ........................................ 713/164; 713/166
(58) Field of Classification Search .................. 380/281; 713/164, 166, 167
See application file for complete search history.

(56) References Cited

U.S. PATENT DOCUMENTS

| | | | | |
|---|---|---|---|---|
| 4,941,176 A * | 7/1990 | Matyas et al. | ............... | 380/280 |
| 5,796,839 A * | 8/1998 | Ishiguro | ................. | 380/44 |
| 6,061,684 A * | 5/2000 | Glasser et al. | .................. | 707/9 |
| 6,289,455 B1 * | 9/2001 | Kocher et al. | ................ | 713/194 |
| 7,017,189 B1 * | 3/2006 | DeMello et al. | ................ | 726/26 |
| 7,131,010 B2 * | 10/2006 | Okaue et al. | ................... | 713/189 |
| 2002/0059286 A1 * | 5/2002 | Challener | ..................... | 707/100 |
| 2002/0104001 A1 * | 8/2002 | Lotspiech et al. | ............ | 713/163 |
| 2003/0084292 A1 * | 5/2003 | Pierce et al. | .................. | 713/168 |
| 2003/0104277 A1 * | 6/2003 | Tokuda et al. | ................ | 429/223 |
| 2003/0138105 A1 * | 7/2003 | Challener et al. | ............ | 380/277 |
| 2004/0153674 A1 * | 8/2004 | Hayashi | ........................ | 713/202 |
| 2006/0004792 A1 * | 1/2006 | Lyle et al. | ..................... | 707/100 |
| 2006/0159272 A1 * | 7/2006 | Ishiguro et al. | ............... | 380/280 |

FOREIGN PATENT DOCUMENTS

WO  02/078286 A2  10/2002

OTHER PUBLICATIONS

D. Wallner, National Security Agency. Request for comments: 2627, Key Management for Multicast. Jun. 1999.*

* cited by examiner

*Primary Examiner* — Kim Vu
*Assistant Examiner* — Randal Moran

(57) ABSTRACT

Processing apparatus, such as a trusted platform, is provided with an access-control arrangement for handling a tree-structured hierarchy such as a key hierarchy. The access-control arrangement only permits access to a particular node of the hierarchy upon receiving a reliable indication that a mechanism expected to resist subversion will attempt to enforce appropriate access restrictions on that node. Such a mechanism is, for example, a protected process executing in a benign environment in the apparatus. The indication that the mechanism is in place is provided by a trusted source, such as a hardware root of trust responsible for initiating the mechanism. Access to the particular node opens the way to revealing that node, and any descendants, to the protected process.

16 Claims, 3 Drawing Sheets

METHOD AND APPARATUS FOR MANAGING A HIERARCHY OF NODES

FIELD OF THE INVENTION

The present invention relates to a method and apparatus for managing a node hierarchy of nodes such as, for example, a key hierarchy used by a trusted platform for protecting sensitive data.

BACKGROUND OF THE INVENTION

TCPA (Trusted Computing Platform Architecture) technology is specified in the TCPA specifications and described, for example, in the book "trusted computing platforms—tcpa technology in context"; Pearson (editor); Prentice Hall; ISBN 0-13-009220-7".

A trusted platform built according to today's TCPA specifications will incorporate a trusted platform subsystem typically comprising a Trusted Platform Module (TPM) in the form of a hardware chip separate from the main CPU, a Root of Trust for Measurement (RTM) formed by the first software to run during the boot process, and support software termed the Trusted platform Support Service (TSS) which performs various functions such as those necessary for communication with the rest of the platform. In a PC, the RTM will typically be founded upon BIOS instructions that cause the main platform processor to do RTM work; this set of instructions is called the Core Root of Trust for Measurement (CRTM) for convenience.

The RTM and associated measurement agents carry out integrity measurements (integrity metrics) on the platform at various stages and store the results in a measurement log in ordinary memory; however, a condensed summary is also stored in Platform Configuration Registers (PCRs) of the TPM.

In addition to the PCRs, the TPM comprises a processor and various cryptographic functions as well as memory for permanently holding secrets such as the private TPM endorsement key and the storage root key (SRK). With regard to the SRK, the TPM supports a Protected Storage mechanism in the form of a hierarchy (tree) of data objects the root of which is the SRK; apart from the SRK that is permanently stored in the TPM (and not released from it), the tree can be stored outside of the TPM. When information in a node is used or revealed, the node is manipulated by the TPM. Each intermediate node object in the tree is encrypted by a key in the node object above it in the tree (the parent node), all the way back to the SRK root node. Each key has an associated authorisation value that must be presented to the TPM (or, more accurately, used in a protocol that proves knowledge of the value without revealing the value) before the TPM permits the key to be used. Intermediate nodes in the tree will always be keys but leaf nodes can be arbitrary data (though frequently they will also be keys, such as symmetric keys for use by application processes in protecting bulk data). Keys in the tree can either be "non-migratable" meaning that the private key is only known to the TPM, or "migratable" meaning that there is no guarantee about the origin and use of the private key.

Access to keys in the key hierarchy (and thus to the data protected by the keys) can be made dependent on the current state of the platform as indicated by the values held in the PCRs. The relevant TCPA functions are TPM_Seal and TPM_Extend which enable a TPM to conceal decryption keys unless the value of current PCR is the same as stored PCR values. This sealing process ("Seal") enables enforcement of the software environment (PCRs) that must exist before data can be revealed, and simultaneously provides a method of concealing data (because the TPM releases a decryption key) until that environment exists. Seal is therefore an access control that depends on the previous state(s) of a platform (represented in terms of PCRs). Seal permits the creator of data to dictate the software environment that must exist in a platform when the data is used A trusted platform built according to today's TCPA specifications can be relied upon to store secrets, provide a platform identity, and reliably report the Operating System (OS) in a platform. Common operating systems cannot be relied upon to protect secrets once they have been revealed to the platform's software, nor to report on what has happened since the OS took control of the platform. This is because these OS's cannot be relied upon to reliably measure and store integrity metrics in the TPM's PCRs. It's not that common OSs can't measure and store integrity metrics, it's that they cannot protect themselves against subversion, so integrity metrics can't be trusted if they were stored after the OS was loaded. One consequence of the lack of trustworthiness of the OS is that the sealing process described above has limited value in platforms with existing conventional OSs, because they cannot be relied upon to reliably measure and store integrity metrics in the TPM's PCRs.

Thus, current trusted platforms are limited because today's Core Root of Trust of Measurement (CRTM) is in a relatively unprotected BIOS chip, and because Operating Systems are insufficiently protected against subversion. Nevertheless, all functions that are provided by a TPM are fully protected, and if the platform's pre-boot environment (especially its BIOS Boot Block, acting as the TCPA Core Root of Trust for Measurement) is properly designed, all operations that executed before the OS can be faithfully recorded in the TPM's PCRs.

If the software on a platform is written to take advantage of the processing "rings" (levels of privilege) on processors (such as Intel processors), that software can use these rings to protect itself against subversion. A secure compartment-OS that is protected by virtue of these processing rings can dynamically create and destroy isolated software compartments. Applications then execute in isolated compartments, which protect the application from other applications, and visa versa. Each compartment provides and protects access to the secrets belonging to the application in the compartment. In servers, or peer-to-peer systems, trusted applications can talk to each other, whether they are in other compartments on the same platform or in compartments in other platforms. One important feature of this type of processing is that it prevents even the platform's administrator from violating the privacy of an application and data.

It is an object of the present invention to facilitate the use of protected processes in trusted platforms and, in particular, the release of keys to such processes. However, the present invention has wider application and is not to be limited in scope by the foregoing objective.

SUMMARY OF THE INVENTION

The present invention relates to a computing platform which has a secure key-handling unit arranged to store a storage root key that forms the root node of a tree-structured node hierarchy the non-leaf nodes of which, other than the root node, each comprise, in encrypted form, a key used to encrypt the or each of its child nodes(and insecure storage for storing the hierarchy nodes other than the root node. The key-handling unit has (i) a memory for storing a current decryption-root key; (ii) a decrypted-access arrangement arranged to restrict decrypted access to the hierarchy nodes to those nodes decryptable by a chain of decryption rooted in said current decryption-root key; and (iii) a current-decryption-root setting arrangement for storing in said memory, in decrypted form, the key of a selected non-leaf node of said hierarchy to serve as said current decryption-root key, the current-decryption-root setting arrangement enabling the selected non-leaf node to be changed.

In one embodiment, the setting arrangement is arranged to permit the selected non-leaf node, and thereby the decryption-root key, to be changed only upon a predetermined set of at least one condition being met. The at least one predetermined condition may comprise the receipt by the key handling unit of an authorization value indicative of particular digital data. In that case the authorization value is preferably a digest of a protected process associated with the node that is intended to be the new selected non-leaf node. In one embodiment, the at least one predetermined condition may comprise that a protected process, associated with the node that is intended to be the new selected non-leaf node, is about to be run by the computing platform. In another embodiment, the at least one predetermined condition may comprise that the key-handling apparatus is requested to change the selected non-leaf node by a root of trust of the computing platform.

Preferably, upon start up of the computing platform, the node at the head of the hierarchy forms the selected non-leaf node.

Preferably the key-handling unit is arranged always to hold securely the node at the head of the hierarchy, in unencrypted form.

Although an embodiment of the present invention is described herein in the context of the TCPA architecture, it is of broader application.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
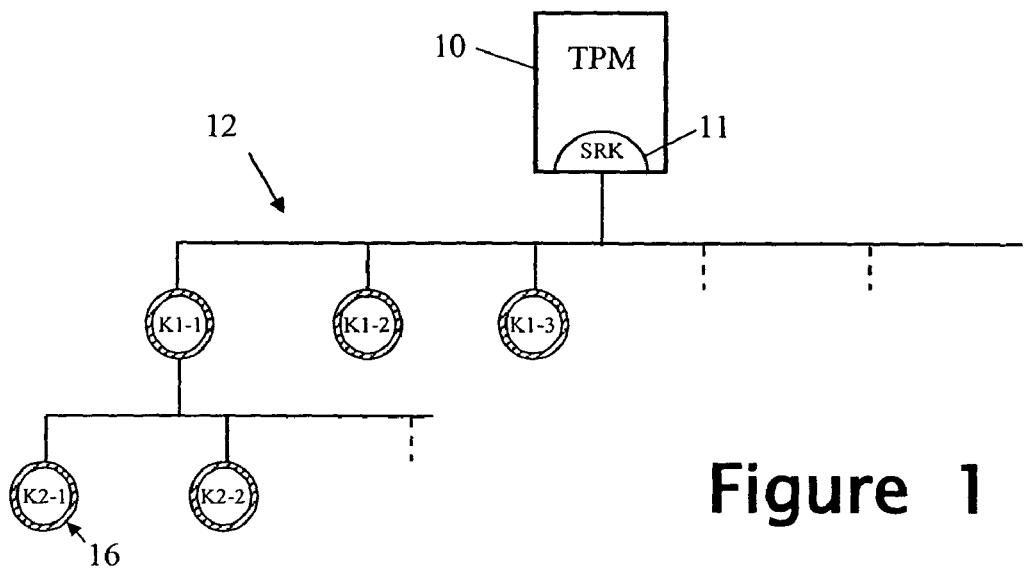
FIG. 1 is a diagram of key hierarchy associated with a Trusted Platform Module.

FIG. 1 illustrates a Trusted Platform Module (TPM) 10 with its normal Protected Storage data-object hierarchy 12 (also referred to below as a key hierarchy). The TPM's Storage Root Key (SRK) 11 resides permanently inside the TPM 10. The SRK 11 is used to encrypt ("wrap") keys K1-1, K1-2, K1-3 etc. that form the next level of the hierarchy. Key K1-1, which in this case is preferably a non-migratable key, itself wraps further keys K2-1, K2-2, etc. The hatched outer annulus around each key in the FIG. 1 key hierarchy 12 is a graphical indication that each key is wrapped (encrypted). A key in the hierarchy 12 can only be decrypted by the TPM 10 upon presentation to the latter of authorizations in respect of the ancestor keys in the hierarchy. A key-handling unit is part of the TPM 10. According to the TCPA specification, the TPM 10 has functionality for managing the Protected Storage hierarchy 12—this functionality is called a "key-handling unit" herein.

In the present example, Key K2-1 is a "dynamic root key object" 16. The dynamic root key 16 can be the child of any node in the key hierarchy 12; for example, the dynamic root key 16 could be a child of the SRK 11 rather than of key K1-1 as illustrated. As will be described below, the dynamic root key 16 acts as the root of a hierarchy of (external) data objects instead of the SRK, in respect of an associated protected process, whether the hierarchy belonging to the protected process is manipulated by the TPM or by the protected process.

The standard TCPA definition of a key is:

```
typedef struct tdTCPA_KEY{
    TCPA_VERSION ver;
    TCPA_KEY_USAGE keyUsage;
    TCPA_KEY_FLAGS keyFlags;
    TCPA_AUTH_DATA_USAGE authDataUsage;
    TCPA_KEY_PARMS algorithmParms;
    UINT32 PCRInfoSize;
    BYTE* PCRInfo;
    TCPA_STORE_PUBKEY pubKey;
    UINT32 encSize;
    [size_is(encData)] BYTE* encData;
} TCPA_KEY;
```

In fact, only the data in "encData" is encrypted (wrapped) by the key above in the key hierarchy, the other data being in cleartext (though any changes are detectable as a digest of that data forms part of the encrypted data).

The keyFlags variable is a structure that indicates Boolean properties of the key, currently redirection, migratable, and volatileKey.

In order to support dynamic root keys, according to the present embodiment, a new key flag DRK (dynamicRootKey) is added to KeyFlags. If the TPM 10 receives a "create key" command with a TCPA_KEY structure where the DRK flag is set, the TPM 10 automatically creates a dynamic root key without any change to the existing key creation functionality of the TPM.

Figure 2:
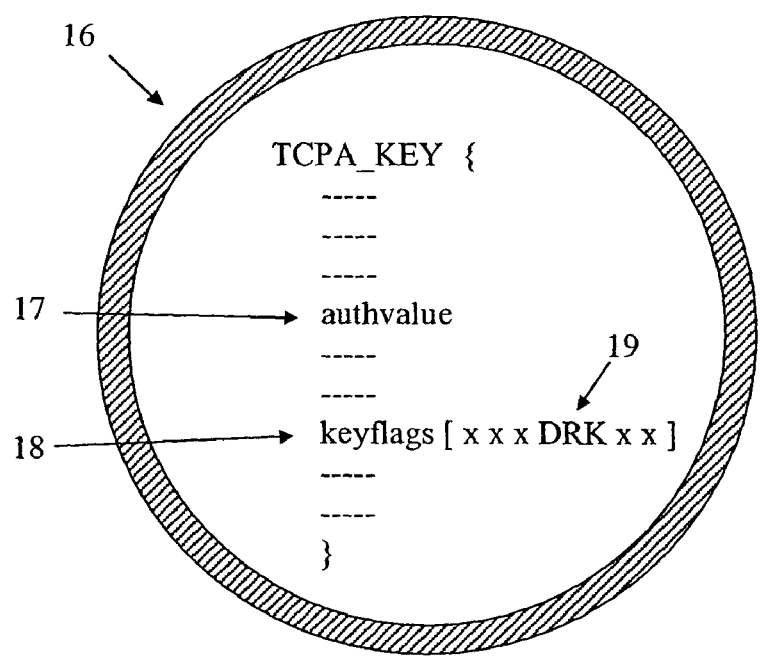
FIG. 2 is a diagram indicating the contents of a dynamic root key object of the FIG. 1 key hierarchy.

FIG. 2 illustrates the data structure of a dynamic root key, such as key 16, created by the TPM 10; as can be seen, the keyflags data 18 includes the DRK flag 19 which is in its 'set' state. The dynamic root key 16 also includes an authorisation value 17 which forms part of the encrypted data in "encData"; in the present case where the key 16 is a dynamic root key, the authorisation value 17 is the digest of a protected process (that is, a process that either protects itself, or is protected by another entity, from subversion, and attempts to enforce benign treatment of data, including enforcing appropriate access restrictions). The digest is created by processing with a hash algorithm the digital data that represents the protected process.

Rather than the TPM 10 creating a dynamic root key on the basis of the state of the DRK flag in a TCPA_KEY structure associated with a "create key" command, a separate flag could be added to the command itself to indicate that the new key is a dynamic root key.

Whenever the TPM loads a key for which the DRK flag 19 is set, it knows that the key is a dynamic root key and proceeds accordingly, as described below.

Figure 3:
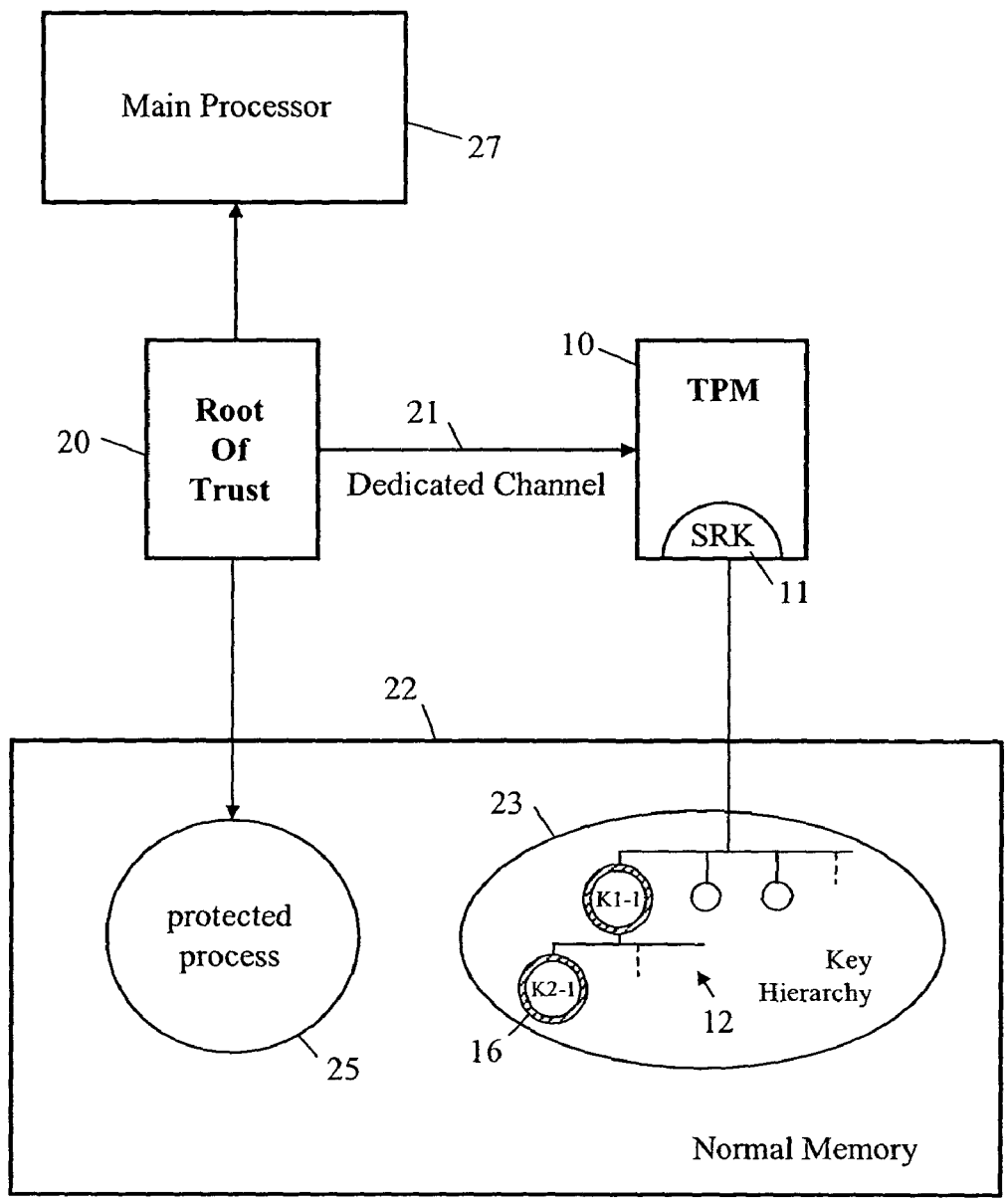
FIG. 3 is a diagram illustrating trusted platform elements involved in starting a protected process.

FIG. 3 illustrates the trusted platform elements involved in starting a protected process 25 such as may be formed by a secure-compartment OS. The TPM 10 of the trusted platform is shown in its condition prior to the activation of the protected process 25 with its SRK 11 forming the root of the available key hierarchy 12 held in Protected Storage 23 that is physically stored in normal memory 22.

A Root of Trust (RT) 20 is responsible for activating the protected process 25 by initiating or permitting its execution by the platform's main processor 27 and by causing the TPM 10 to unlock the dynamic root key and enable its use, for example, to access keys that depend from it in the key hierarchy or to wrap and unwrap data presented to the TPM. The RT 20 is analogous to the RTM of a trusted platform and may, for example, be a hardware device (either part of the platform or dockable with it) or the platform as a whole running trusted software. The RT 20 is able to communicate with the TPM 10 in a manner that enables the TPM to believe that the communication came from the RT 20 (for example, the communication can be passed over a dedicated virtual or physical channel 21 or a trustable authentication process is used).

Figure 4:
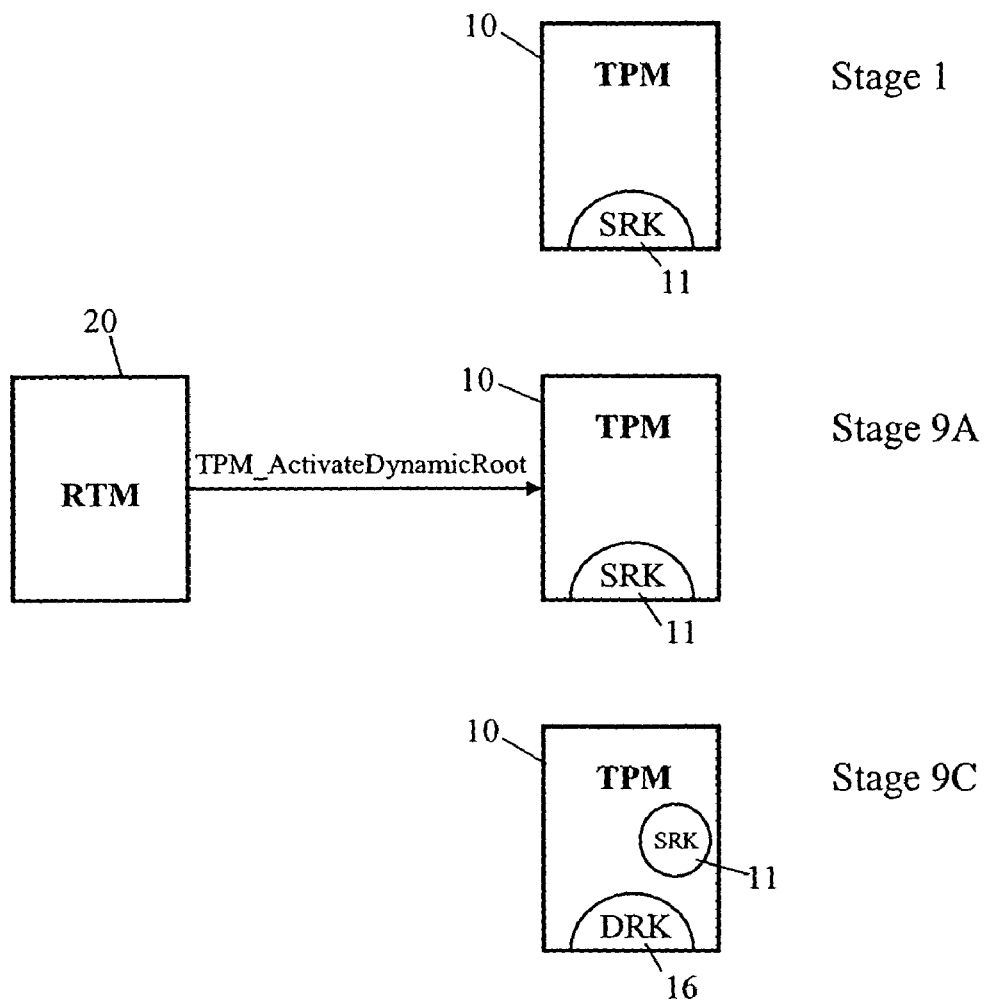
FIG. 4 is a diagram illustrating certain stages in the activation of a dynamic root key associated with the FIG. 3 protected process.

The various stages involved in the installation of the dynamic root key 16 (and any dependent object hierarchy) that is associated with the protected process 25 are described below with certain of these stages being illustrated in FIG. 4.

1. At switch-on of the trusted platform, the TPM 1.0 (always) has the SRK 11 at the root of the available key hierarchy (see FIG. 4).
2. At some point, the RT 20 determines that the protected process 25 associated with the dynamic root key 16 is the next process to execute and either has exclusive access to the TPM 10 (because the RT 20 has, for example, cleared all other processes from memory), or any existing protected processes will not abuse information obtained from the TPM (for example, the RT 20 may itself be a secure-compartment OS wishing to start process 25 in a compartment).
3. The RT 20 computes a digest of the protected process 25.
4. The key object K1-1 is loaded (using TPM_Loadkey) into the TPM 10 with authorisation to use the SRK 11; the load command and the related authorisation may come from the RT 20 or another element of the platform triggered by the RT 20.
5. The TPM 10 decrypts the key object K1-1 using the SRK's private key and obtains the key inside the K1 key object.
6. The key object K2-1 (the dynamic root key object 16) is loaded into the TPM 10 with authorisation to use the unwrapped key K1-1; again, the load command and the related authorisation may come from the RT 20 or another element of the platform triggered by the RT 20.
7. The TPM 10 checks that unwrapped key K 1-1 is a normal key by checking its DRK flag bit in the KeyFlags structure, and uses the unwrapped private key of key object K1-1 to decrypt key object K2-1 and obtain the key inside the dynamic root key object 16.

Step 8 or Step 9 is then carried out according to the conditions indicated below 8. A. If the dynamic root key object 16 was stored as a leaf-node (encrypted with a TPM_KEY_BIND key, for example) and intended to be revealed to the protected process (using a TPM_UnBind command, for example), the RT 20 presents the TPM 10 with authorisation to reveal the contents of object K2-1, this authorisation being the digest of the protected process 25 associated with the dynamic root key 16.
   B. The TPM 10 notes that the key inside the key object K2-1 is a dynamic root key (by checking its DRK flag bit in the KeyFlags structure) and therefore verifies that the authorization came from the RT 20 (for example, by checking the channel on which the command was received), before revealing the key.
   C. The protected process 25 can then use the revealed dynamic root key object 16 as the root of a key hierarchy manipulated directly by the protected process, for example.
9. A. If the dynamic root key object 16 has child objects that will be manipulated by the TPM (the dynamic root key object 16 is a TPM_KEY_BIND key or TPM_KEY_STORAGE key, for example), the RT 20 presents a TPM_ActivateDynamicRoot command to the TPM 10 with authorisation to use the key inside the key object K2-1, this authorisation being the digest of the protected process 25 associated with the dynamic root key 16 (see FIG. 4).
   B. The TPM 10 verifies that the TPM_ActivateDynamicRoot command came from the RT 20 (for example, by checking the channel on which the command was received), and that the key inside the key object K2-1 is a dynamic root key (by checking its DRK flag bit in the KeyFlags structure).
   C. The TPM 10 deactivates, but does not unload or discard, the SRK 11 and uses the dynamic root key 16 from the K2-1 key object as if it were the SRK (see FIG. 4). In other words, the key 16 forms the root of a hierarchy of data objects, and its private key never leaves the TPM in plaintext form. When the TPM 10 loads the dynamic root key 16, the TPM unloads any existing keys including any previous dynamic root key (the SRK 11 is, however, retained in the TPM), and invalidates any keys that might have been cached outside the TPM 10 in encrypted form.
   (As an alternative to the use of the TPM_ActivateDynamicRoot command as described above, the TPM could automatically replace the SRK by the DRK on recognizing that the DRK is a TPM_KEY_BIND key or TPM_KEY_STORAGE key and that authorisation came from the RT 20).

Thereafter, the dynamic root key 16 acts as the root of a hierarchy of (external) data objects instead of the SRK 11, in respect of the associated protected process 25, whether or not the processing of the hierarchy is done by the TPM or by the protected process 25.

If the SRK has been displaced by dynamic root key 16 (Step 9 above), one consequence is that it is no longer possible to go higher up the key hierarchy 12 than the dynamic root key 16 whilst the latter is activated. Once the DRK has replaced the SRK, it does not necessarily require further usage authorisation; furthermore, the DRK's child nodes do not necessarily require usage authorisation. This is because the loaded DRK and its child objects can be interpreted only while a safe environment exists so that generally there will be no need to require authorisation to use them. Hence the DRK may use the TCPA setting TPM_AUTH_NEVER once it has replaced the SRK, and the DRK's children may always use TPM_AUTH_NEVER. The TPM 10 continues to use the dynamic root key 16 instead of the SRK 11 until either a new dynamic root key is loaded and activated or until the SRK 11 is reloaded. The SRK 11 can be reloaded by either restarting the TPM 10, or by providing a new TPM command, TPM_InstallSRK (say). If the SRK has been displaced by dynamic root key 16, and the RTM or other protected process determines that the software environment is no longer benign, the RTM or other protected process preferably reload the SRK.

With the dynamic root key 16 installed, the protected process 25 can be run and can access the key 16 or data protected by the key 16 or a key below it in the key hierarchy.

Furthermore, as the protected process is now responsible for the trustworthiness of processes it runs, it is no longer necessary to use the seal and unseal functions described above to limit the initiation of processes to certain states of the platform. This is because previous history of the protected process is irrelevant because of the protections afforded to a protected process.

It will be appreciated that many variants are possible to the above described embodiments of the invention. Thus, for example, although in the foregoing, only one dynamic root key has been illustrated as part of the key hierarchy 12, it will be appreciated that multiple dynamic keys can be included in the hierarchy. Whether there is one or multiple dynamic root keys, the TPM 10 is preferably able to reliably indicate the root key that is currently active. This can be done, for example, by having the TPM 10 sign a value associated with the current root key, using a TPM identity key. The value that is signed could be the authorisation value of the dynamic root key but is, preferably, a digest of the authorisation value of the root key concerned.

It is also possible to arrange for a dynamic root key and its descendants to be manipulated by the TPM without the dynamic root key replacing the SRK. In one implementation, the TPM is arranged to store a "Dynamic Root Release" (DRR) indicator to indicate when the RT 20 has determined that it is safe to reveal the secrets belonging to a particular process—typically, the indicator would be a digest of the dynamic root key, the digest serving as an identifier of the root key. The secrets, stored in the protected storage hierarchy, that are descendants of the DRK are tagged with a root identifier (in the present example, the digest of the root key) to indicate that they can only be accessed when the TPM holds a corresponding DRR indicator. It is then the responsibility of the TPM to ensure that these secrets are revealed only when the TPM holds a DRR indicator that matches the process identifier stored with the secrets.

The invention claimed is:

1. A computing platform comprising:
a secure key-handling unit arranged to store a storage root key that forms the root node of a tree-structured node hierarchy the non-leaf nodes of which, other than the root node, each comprise, in encrypted form, a key used to encrypt the or each of its child nodes, and
insecure storage for storing the hierarchy nodes other than the root node;
the key-handling unit comprising:
a memory for storing the storage root key and a current decryption-root key;
a decrypted-access arrangement arranged to restrict decrypted access to the hierarchy nodes to those nodes decryptable by a chain of decryption rooted in said current decryption-root key, wherein the decrypted-access arrangement is operable in a mode where the current decryption-root key corresponds to a node of said hierarchy other than the root node and one or more nodes higher up in said hierarchy than is the node corresponding to the current decryption-root key are not available; and
a current-decryption-root setting arrangement for storing in said memory, the key of a selected non-leaf node of said hierarchy to serve as said current decryption-root key, the current-decryption-root setting arrangement enabling the selected non-leaf node to be changed.

2. A computing platform according to claim 1, wherein the setting arrangement is arranged to permit the selected non-leaf node, and thereby the decryption-root key, to be changed only upon a predetermined set of at least one condition being met.

3. A computing platform according to claim 2, wherein at least one predetermined condition comprises the receipt by the key handling unit of an authorization value indicative of particular digital data.

4. A computing platform according to claim 3, wherein said authorization value is a digest of a protected process associated with the node that is intended to be the new selected non-leaf node.

5. A computing platform according to claim 2, wherein at least one predetermined condition comprises that a protected process associated with the node that is intended to be the new selected non-leaf node is about to be run by the computing platform.

6. A computing platform according to claim 5, wherein at least one predetermined condition comprises that any other currently-activated processes running on the computing platform are benign.

7. A computing platform according to claim 2, wherein at least one predetermined condition comprises that the key-handling unit is requested to change the selected non-leaf node by a root of trust of the computing platform.

8. A computing platform according to claim 1, wherein upon start up of the computing platform, the node at the head of the hierarchy, forms said selected non-leaf node.

9. A computing platform according to claim 1, wherein the key-handling unit is arranged always to hold securely the node at the head of the hierarchy, in unencrypted form.

10. A computing platform according to claim 1, wherein the key-handling unit is arranged to indicate the selected non-leaf node by signing a value associated with the node using an identity key associated with the key-handling unit.

11. A computing platform according to claim 1, wherein the key-handling unit is so arranged that only a particular type of non-leaf node, herein a dynamic key node, can be used as the selected non-leaf node in addition to the node at the head of the hierarchy.

12. A computing platform according to claim 11, wherein the key-handling unit is arranged, upon receipt of a corresponding command, to generate a dynamic key node as a node of said hierarchy.

13. A computing platform according to claim 1, wherein the setting arrangement is arranged to permit the selected non-leaf node to be changed to one associated with a protected process upon receipt by the key-handling unit of a reliable indication that a mechanism expected to resist subversion will attempt to enforce appropriate access restrictions on that node and any descendent nodes, the key of the non-leaf node associated with said protected process being available for use in relation to the protected process upon becoming the decryption root key.

14. A computing platform according to claim 1, wherein the key-handling unit comprises a Trusted Platform Module.

15. A computing platform according to claim 1, wherein the current-decryption-root setting arrangement operates to decrypt content of the selected non-leaf node of said hierarchy to determine the current decryption-root key.

16. A computing platform according to claim 1, wherein the current-decryption-root setting arrangement stores in said memory, in decrypted form, the key of the selected non-leaf node of said hierarchy to serve as said current decryption-root key.

* * * * *

UNITED STATES PATENT AND TRADEMARK OFFICE
CERTIFICATE OF CORRECTION

PATENT NO. : 8,261,063 B2
APPLICATION NO. : 10/688397
DATED : September 4, 2012
INVENTOR(S) : Graeme John Proudler Page 1 of 1

It is certified that error appears in the above-identified patent and that said Letters Patent is hereby corrected as shown below:

In the Specification:

In column 2, line 63, delete "nodes(and" and insert -- nodes, and --, therefor.

Signed and Sealed this
Tenth Day of September, 2013

Teresa Stanek Rea
*Acting Director of the United States Patent and Trademark Office*